(12) United States Patent
Ito et al.

(10) Patent No.: US 11,541,796 B2
(45) Date of Patent: Jan. 3, 2023

(54) GEARING DEVICE FOR SEAT

(71) Applicant: TOYOTA BOSHOKU KABUSHIKI KAISHA, Aichi (JP)

(72) Inventors: Sadao Ito, Aichi (JP); Masaki Okada, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 4 days.

(21) Appl. No.: 17/202,718

(22) Filed: Mar. 16, 2021

(65) Prior Publication Data

US 2021/0291713 A1 Sep. 23, 2021

(30) Foreign Application Priority Data

Mar. 19, 2020 (JP) .............................. JP2020-049239

(51) Int. Cl.
*F16H 1/32* (2006.01)
*B60N 2/90* (2018.01)

(52) U.S. Cl.
CPC ............ *B60N 2/919* (2018.02); *B60N 2/995* (2018.02); *F16H 1/32* (2013.01); *F16H 2001/327* (2013.01)

(58) Field of Classification Search
CPC ................. F16H 1/32; F16H 2001/327; F16H 2001/324; B60N 2002/0236
See application file for complete search history.

(56) References Cited

U.S. PATENT DOCUMENTS

| | | | | | |
|---|---|---|---|---|---|
| 5,398,904 | A | * | 3/1995 | Rees | B60N 2/0224 475/162 |
| 6,547,687 | B2 | * | 4/2003 | Hagiike | F16H 1/32 475/181 |
| 6,814,406 | B2 | * | 11/2004 | Ito | B60N 2/1839 297/284.11 |
| 7,497,519 | B2 | * | 3/2009 | Dill | F16H 1/2836 475/162 |

(Continued)

FOREIGN PATENT DOCUMENTS

| | | | |
|---|---|---|---|
| DE | 102005028774 A1 | * 11/2006 | ............ B62D 5/008 |
| JP | 2002295604 A | * 10/2002 | |
| JP | 2006026398 A | * 2/2006 | |

(Continued)

*Primary Examiner* — Sherry L Estremsky
(74) *Attorney, Agent, or Firm* — Greenblum & Bernstein, P.L.C.

(57) ABSTRACT

Disclosed is a gearing device for a seat including a first internally toothed gear, a second internally toothed gear, an externally toothed gear, and an eccentric member. The first internally toothed gear includes a rotation center axis. The second internally toothed gear has the rotation center axis in common with the first internally toothed gear and is rotatably supported by the first internally toothed gear. The externally toothed gear is arranged to an inner side of the first and the second internally toothed gear, to thereby mesh with the first and the second internally toothed gears. The eccentric member rotates the externally toothed gear such that a rotation center thereof follows a path around the rotation center axis, rotatably supports the externally toothed gear about the rotation center, and rotates about the rotation center axis in response to a rotational force being externally input thereto.

6 Claims, 10 Drawing Sheets

(56) References Cited

U.S. PATENT DOCUMENTS 7,837,266 B2* 11/2010 Lehmann ............... B60N 2/225
                                                               297/354.1
10,683,911 B2* 6/2020 Praca ...................... F16H 57/02

FOREIGN PATENT DOCUMENTS

| JP | 4645315 B2 | 3/2011 | |
|----|------------|--------|---|
| KR | 20110102647 A * | 9/2011 | |
| WO | WO-2006058660 A1 * | 6/2006 | ............. B62D 5/008 |
| WO | WO-2012156079 A2 * | 11/2012 | ............. H02K 41/06 |

* cited by examiner

GEARING DEVICE FOR SEAT

CROSS-REFERENCE TO RELATED APPLICATIONS

This application claims the benefit of Japanese patent application No. 2020-49239 filed on Mar. 19, 2020 with the Japan Patent Office, the entire disclosure of which is incorporated herein by reference.

BACKGROUND

The present disclosure relates to a gearing device that is applied to a seat.

For example, a gearing device for a seat disclosed in Japanese Patent No. 4645315 includes two internally toothed gears, an externally toothed gear that meshes with both the internally toothed gears while being interposed therebetween, and an eccentric camshaft that rotates the externally toothed gear.

SUMMARY

In the invention disclosed in Japanese Patent No. 4645315, loads, which are applied to one of the internally toothed gears and the externally toothed gear, act on the eccentric camshaft and respective points of application of the loads are displaced greatly from a direction along a rotation center axis. This displacement generates a moment that tilts the eccentric camshaft. If the eccentric camshaft tilts, the loads tend to be concentrated on a particular portion of the gearing device. As a result, such a portion has an increased frictional resistance, which may lead to an operation failure of the gearing device for a seat.

In one aspect of the present disclosure, it is desirable to provide a gearing device for a seat that can inhibit an occurrence of the operation failure.

One aspect of the present disclosure is a gearing device for a seat.

A gearing device for a seat comprises a first internally toothed gear, a second internally toothed gear, an externally toothed gear, and an eccentric member. The first internally toothed gear includes teeth that protrude toward a rotation center axis of the first internally toothed gear. The second internally toothed gear has the rotation center axis in common with the first internally toothed gear, includes teeth that protrude toward the rotation center axis, and is rotatably supported by the first internally toothed gear. The externally toothed gear is arranged to an inner side of the first internally toothed gear and an inner side of the second internally toothed gear, to thereby mesh with the first internally toothed gear and the second internally toothed gear, and includes teeth that are smaller in number relative to the teeth of the first internally toothed gear and the teeth of the second internally toothed gear. The eccentric member rotates the externally toothed gear such that a rotation center of the externally toothed gear follows a path around the rotation center axis, rotatably supports the externally toothed gear about the rotation center, and rotates about the rotation center axis in response to a rotational force being externally input thereto.

With the above configuration, in the above gearing device for a seat, the first internally toothed gear receives most of loads applied to the gearing device for a seat. Consequently, a point of application of each load is inhibited from displaced greatly from a direction along the rotation center axis, thereby inhibiting increase in moment (hereinafter, referred to as a tilting moment) that tilts the eccentric member. Accordingly, the eccentric member is inhibited from tilting, whereby an occurrence of an operation failure of the gearing device can be inhibited.

In one aspect of the present disclosure, the eccentric member may be rotatably supported by the first internally toothed gear. Such a configuration improves an effect for inhibiting generation of the tilting moment, whereby the occurrence of the operation failure can be inhibited.

In one aspect of the present disclosure, the first internally toothed gear may include a first main body that has a disc shape, and a first flange portion that has an annular shape and protrudes from an outer edge of the first main body toward the second internally toothed gear. The second internally toothed gear may include a second main body that has a disc shape, and a second flange portion that has an annular shape, protrudes from an outer edge of the second main body toward the first internally toothed gear, and is placed in sliding contact with the first flange portion. The second flange portion makes the sliding contact with the first flange portion, whereby the second internally toothed gear may be allowed to be rotatably supported by the first internally toothed gear.

In one aspect of the present disclosure, the externally toothed gear may be arranged between the first main body and the second main body. The first main body may be provided with a bearing portion that has a cylindrical shape and protrudes toward the second main body to rotatably support the eccentric member. Such a configuration can inhibit the point of application of each load from being displaced greatly from the direction along the rotation center axis.

In one aspect of the present disclosure, the second main body may be provided with a hole in which a part of the eccentric member is fitted. An inner wall of the hole and the eccentric member may form a gap therebetween. Such configurations improve an effect for inhibiting a load applied to the second internally toothed gear from acting on the eccentric member. Accordingly, it is possible to inhibit the point of application of each load from displaced greatly from the direction along the rotation center axis.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

Figure 1:
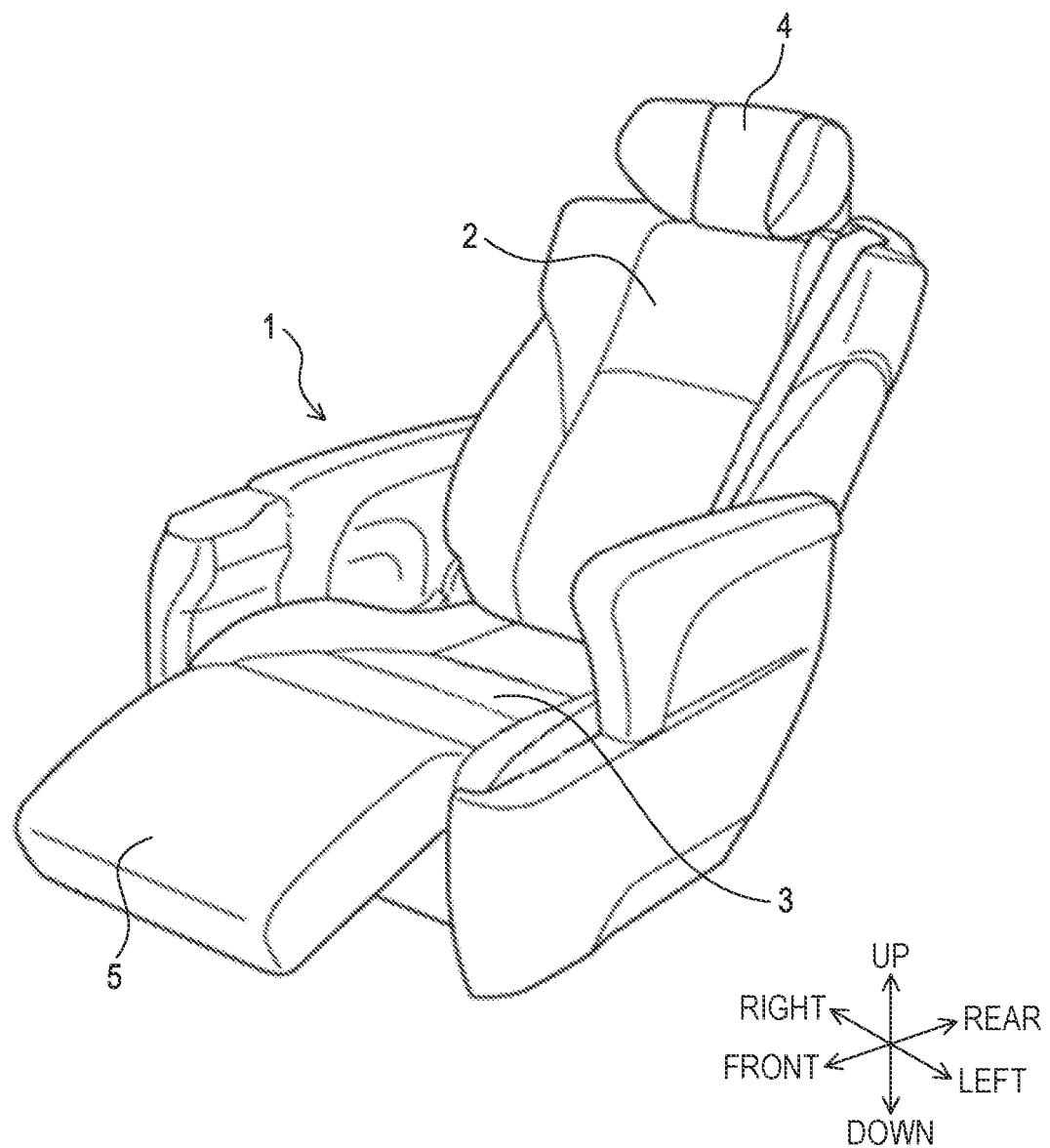
FIG. 1 is a view showing a vehicle seat according to a first embodiment.

An "embodiment" to be described below is one example of embodiments that fall within the technical scope of the present disclosure. In other words, matters specifying the invention recited in claims are not limited to specific configurations, structures, and the like that are shown in the embodiment below.

The present embodiment is a seat to be mounted in a vehicle such as an automobile (hereinafter, referred to as a vehicle seat). Arrows, diagonal lines, and other marks that indicate the directions labelled on drawings are made for easy understanding of relationships between the drawings and for easy understanding of shapes of members and/or portions shown in the drawings.

Therefore, the gearing device is not limited to the directions labelled on the drawings. The directions shown in the drawings are based on a state where the vehicle seat of the present embodiment is assembled to the vehicle. The drawings with diagonal lines provided thereon are not necessarily sectional views.

At least in respect of a member or a portion that is labelled with a reference numeral for explanations, there is at least one in number of such a member or a portion unless the number is otherwise specified, for example, as "only one of". In other words, there may be two or more of such a member or a portion when the number is not specified. A gearing device shown in the present disclosure comprises at least constituent elements, such as members or portions described with reference numerals, and structural portions illustrated in the drawings.

First Embodiment

<1. Overview of Vehicle Seat>

A vehicle seat 1 shown in FIG. 1 comprises at least a seatback 2, a seat cushion 3, a headrest 4, and an ottoman 5. The seatback 2 supports a back of an occupant.

The seat cushion 3 supports buttocks of the occupant. The headrest 4 supports the head of the occupant from behind. The ottoman 5 supports calves and the like of the occupant.

The ottoman 5 is attached to a front end of the vehicle seat 1 (the seat cushion 3). The ottoman 5 of the present embodiment is displaceable between a "position that can support calves (see, FIG. 1)" and a "position retrieved at the front end of vehicle seat (not shown)".

Figure 2:
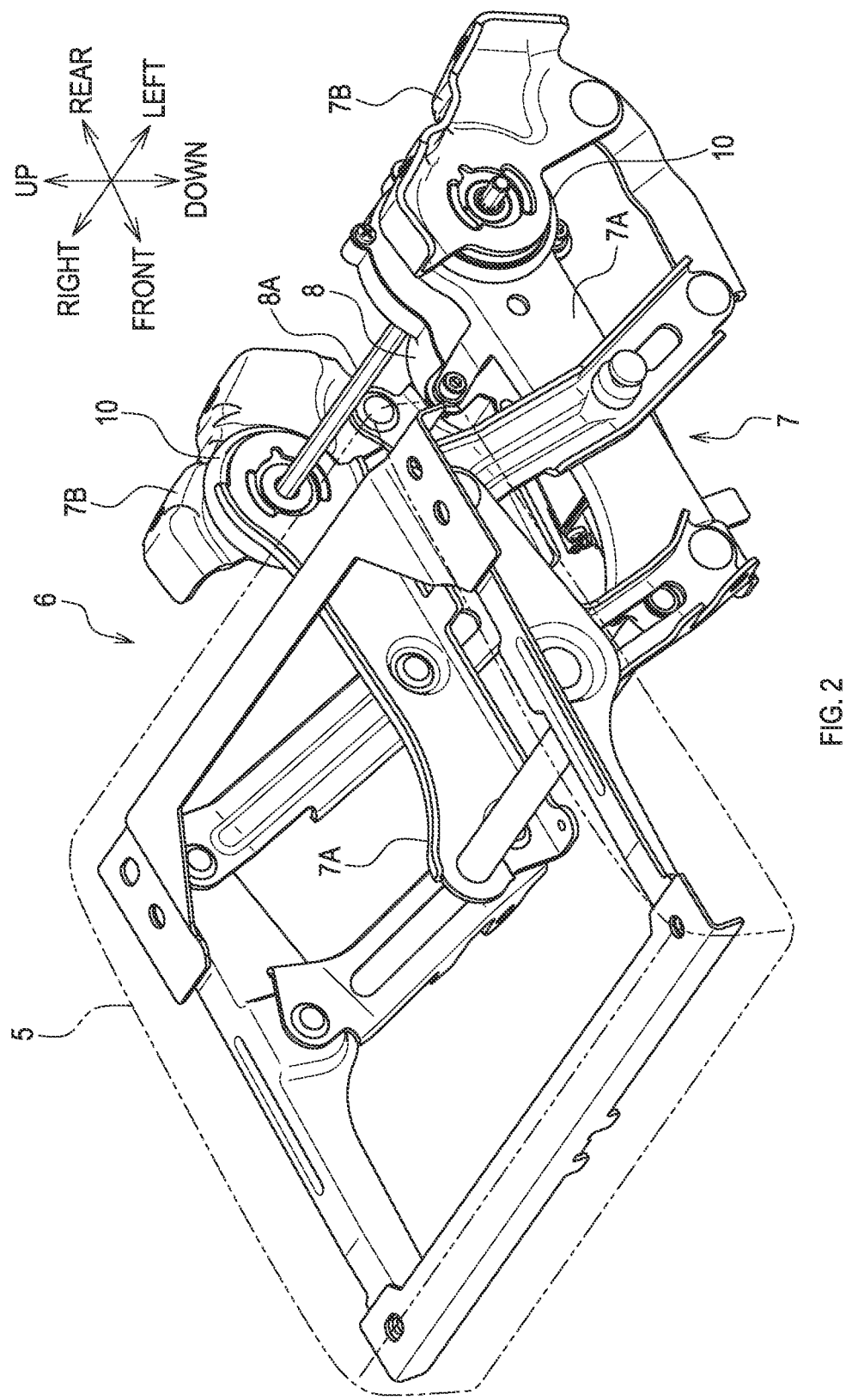
FIG. 2 is a view showing an ottoman device for a vehicle seat according to the first embodiment.

The ottoman 5 is displaceably supported by a movable device 6, which is shown in FIG. 2. The movable device 6 includes at least a link mechanism 7 and an electric motor 8. The link mechanism 7 is a mechanism for displacing the ottoman 5.

The link mechanism 7 of the present embodiment is a linkage using a X-shaped pantograph linkage. The link mechanism 7 includes two X-shaped linkages that are arranged on the right side and the left side. The two X-shaped linkages are configured to be bilaterally symmetric to each other.

The electric motor 8 generates a rotational force that rotatably displaces two driving links 7A. Two gearing devices 10 of the present embodiment reduce a rotational output of the electric motor 8 and transmit the reduced rotational output to the two driving links 7A.

Each driving link 7A is an arm-shaped member that configures corresponding one of the X-shaped linkages (the link mechanism 7). The link mechanism 7 is coupled to the front end of the seat cushion 3 via two support arms 7B.

Each support arm 7B is coupled to corresponding one of the two driving links 7A via corresponding one of the gearing devices 10. The electric motor 8 is fixed to one of the two driving links 7A. The rotational force of the electric motor 8 is transmitted to each gearing device 10 by a driving shaft 8A.

<2. Gearing Device>

The two gearing devices 10 are configured to be bilaterally symmetric to each other. Also, relations between the gearing devices 10 and the driving links 7A, the support arms 7B are bilaterally symmetric to each other. Following descriptions are given to the gearing device 10 and other members/portions arranged on the left side in FIG. 2.

Figure 3:
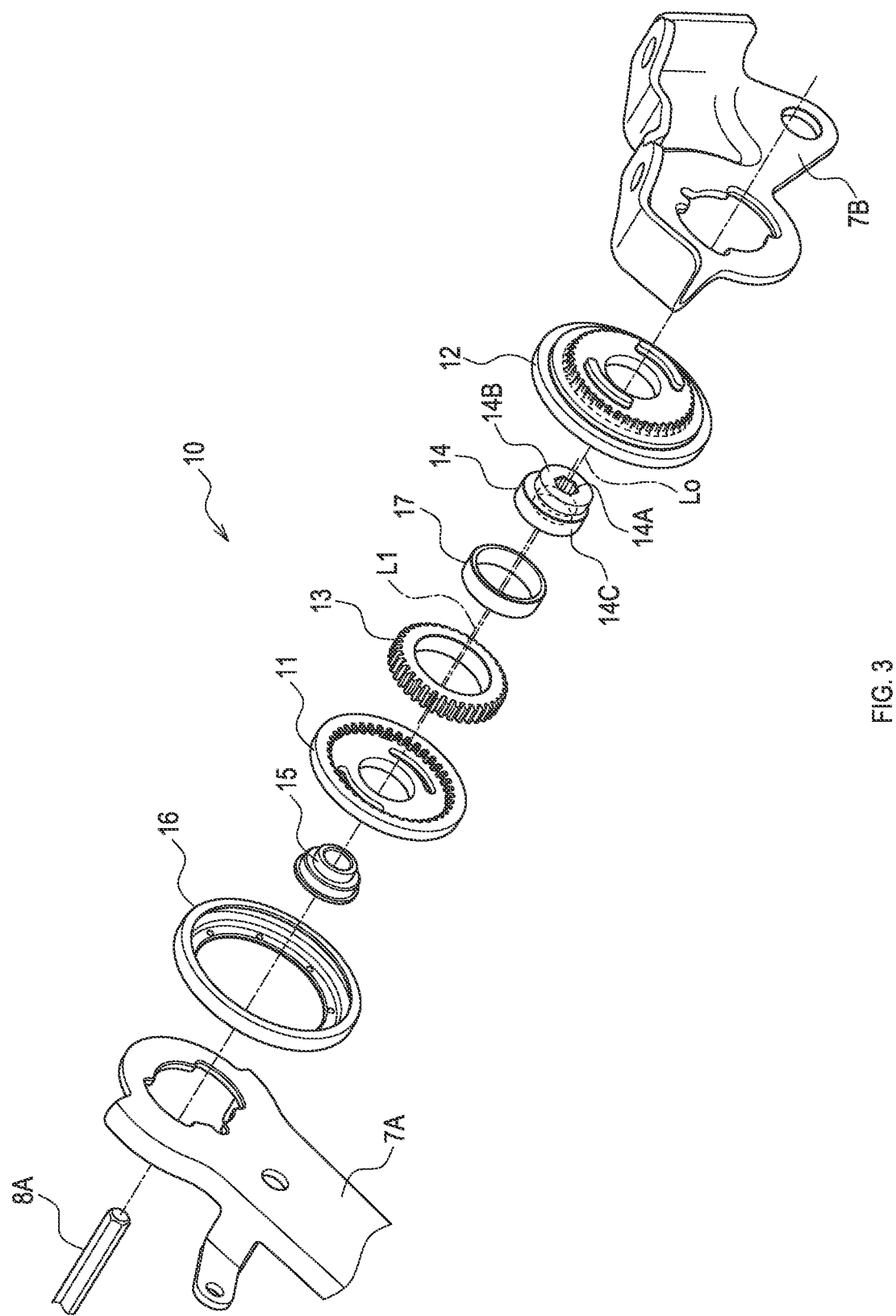
FIG. 3 is an exploded view of a gearing device for a vehicle seat according to the first embodiment.
Figure 4:
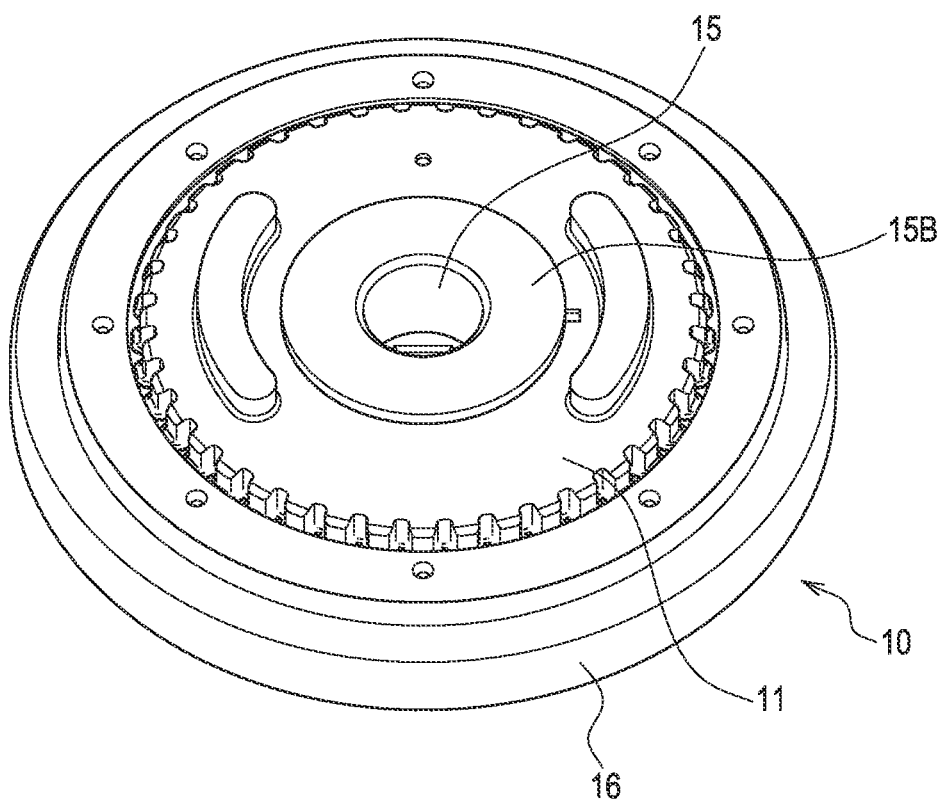
FIG. 4 is an external view of the gearing device for a vehicle seat according to the first embodiment.
Figure 5:
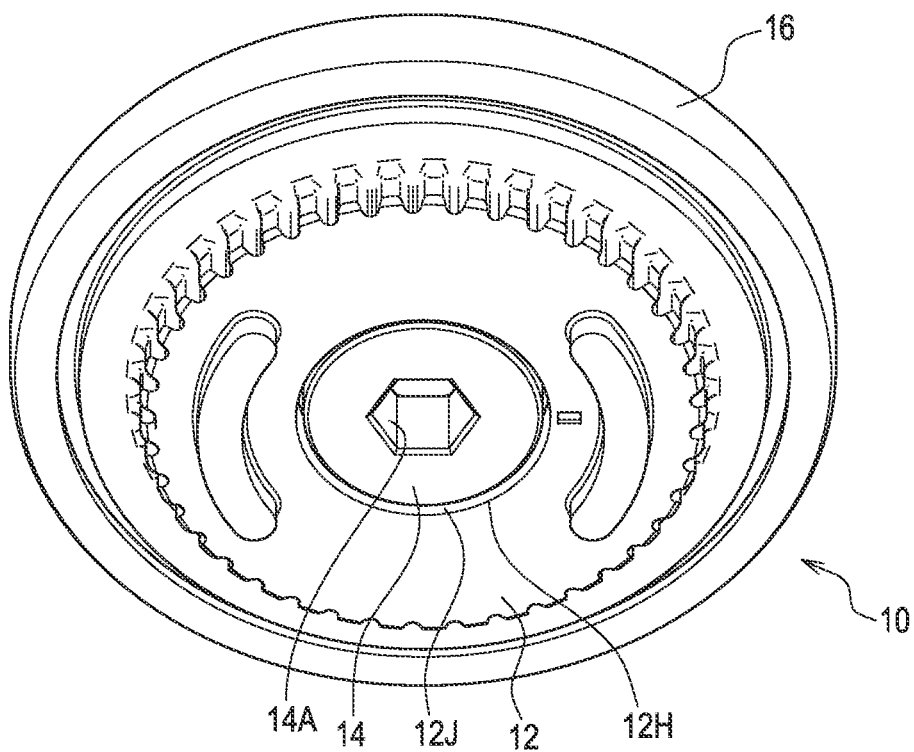
FIG. 5 is an external view of the gearing device for a vehicle seat according to the first embodiment.

As shown in FIGS. 3 to 5, the gearing device 10 comprises at least a first internally toothed gear 11, a second internally toothed gear 12, an externally toothed gear 13, an eccentric member 14, and a bearing portion 15. The externally toothed gear 13 rotates while meshing with the first internally toothed gear 11 and the second internally toothed gear 12. The eccentric member 14 rotates the externally toothed gear 13.

<Details of First Internally Toothed Gear and Second Internally Toothed Gear>

Figure 6:
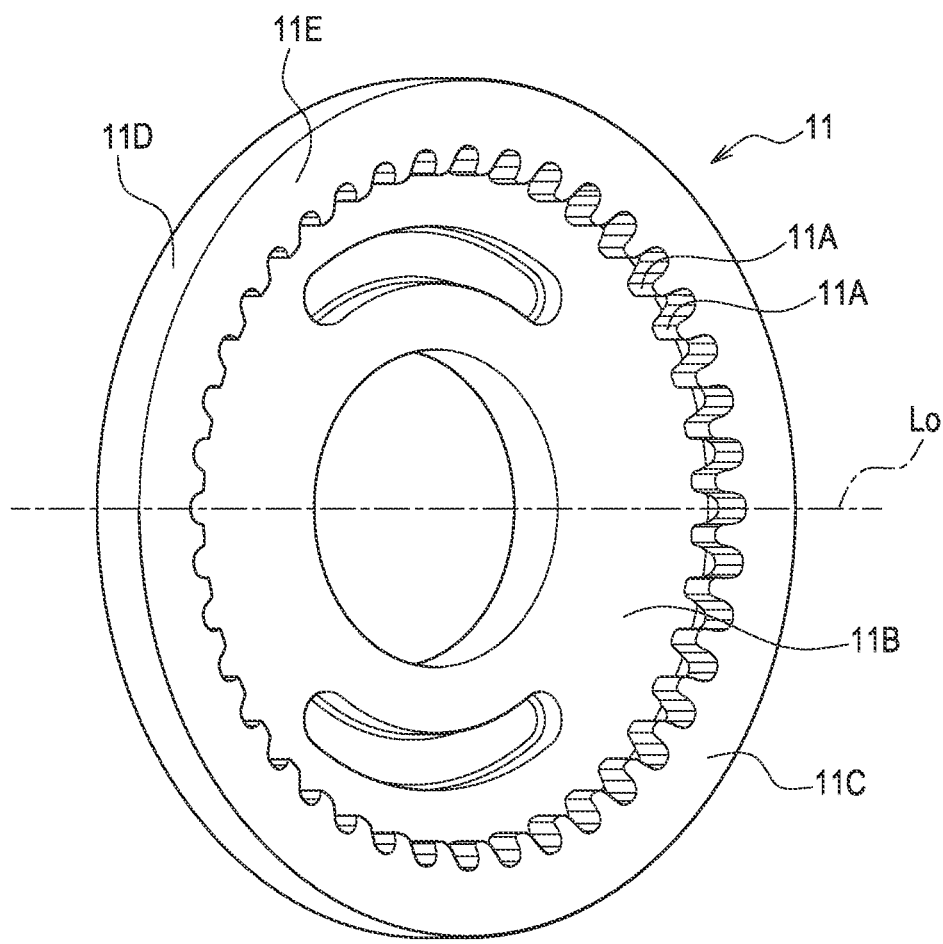
FIG. 6 is an external view of a first internally toothed gear according to the first embodiment.

As shown in FIG. 6, the first internally toothed gear 11 is a gear that includes teeth 11A that protrude toward a rotation center axis Lo of the first internally toothed gear 11. The first internally toothed gear 11 includes a first main body 11B and a first flange portion 11C.

The first main body 11B is a portion that has a substantially disk shape. The first flange portion 11C is an annular shape portion that protrudes from an outer edge of the first main body 11B toward the second internally toothed gear 12. In the first internally toothed gear 11 of the present embodiment, an inner circumferential surface of the first flange portion 11C is provided with the teeth 11A.

The first internally toothed gear 11 of the present embodiment is configured such that the teeth 11A, the first main body 11B, and the first flange portion 11C are formed as one integral member by plastic working such as forging and press-forming.

Figure 7:
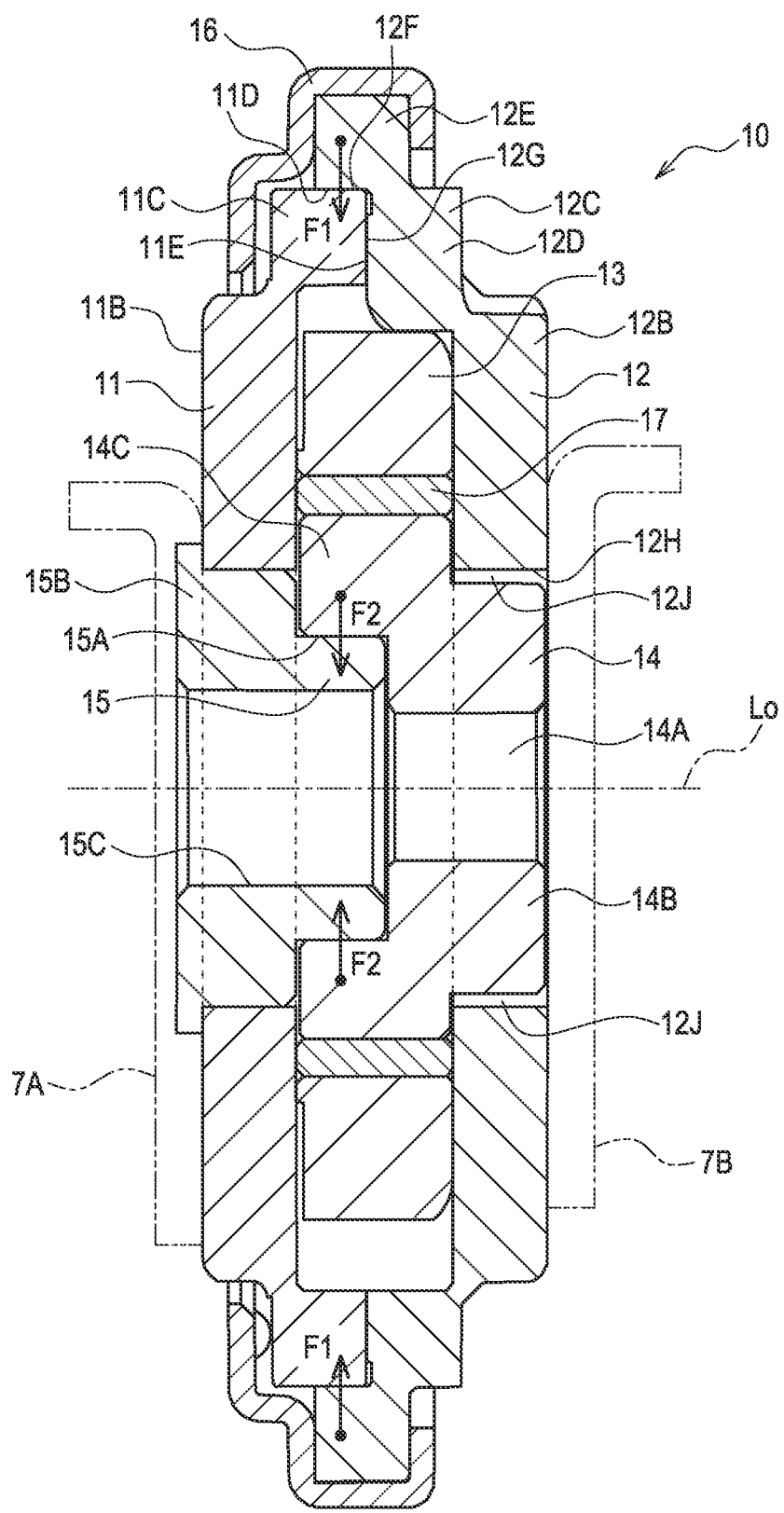
FIG. 7 is a structural view of the gearing device for a vehicle seat according to the first embodiment.

As shown in FIG. 7, the second internally toothed gear 12 is a gear that has the rotation center axis Lo in common with the first internally toothed gear 11 and includes teeth 12A (see, FIG. 8) that protrude toward the rotation center axis Lo.

Figure 8:
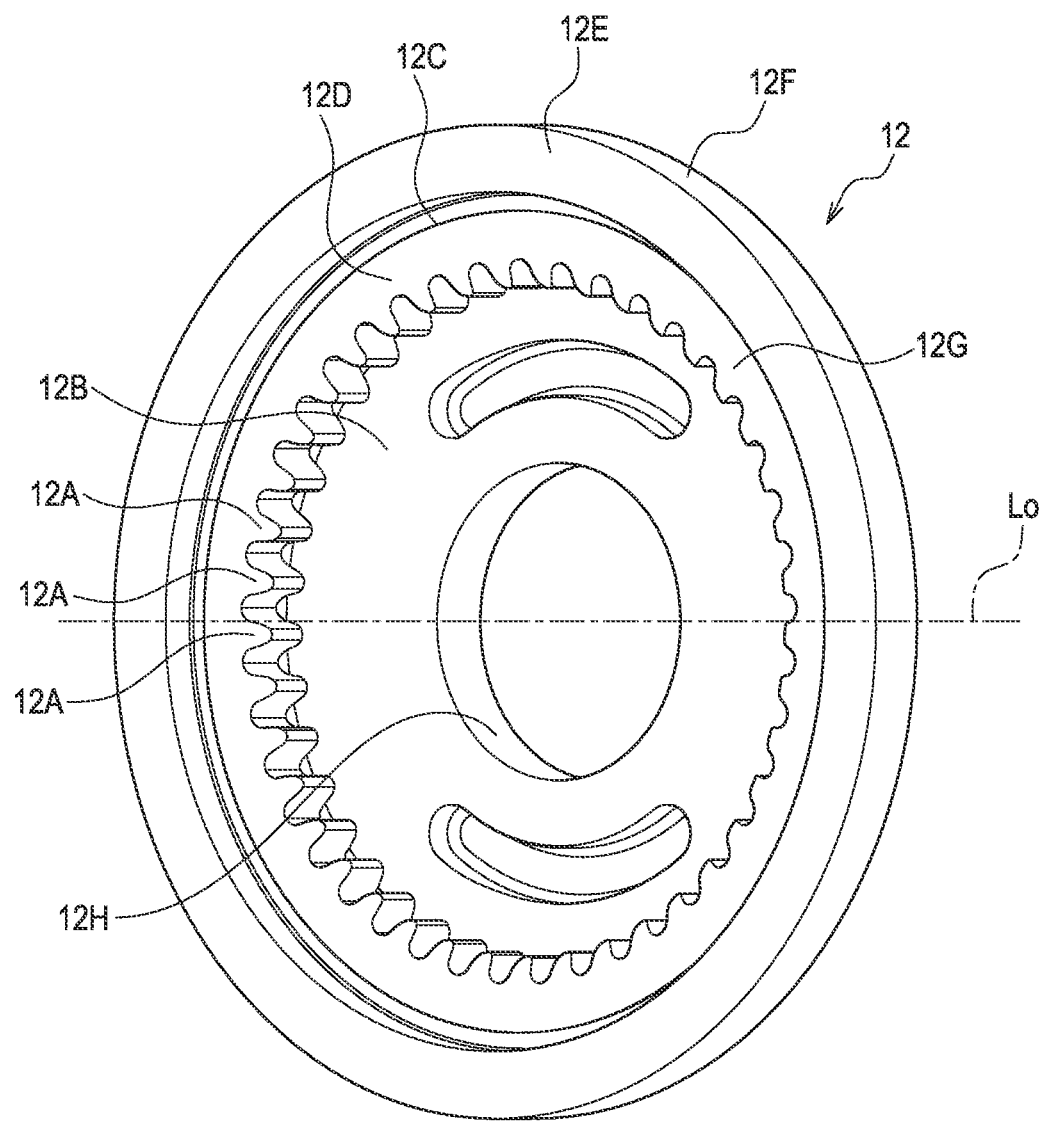
FIG. 8 is an external view of a second internally toothed gear according to the first embodiment.

As shown in FIG. 8, the second internally toothed gear 12 includes a second main body 12B that has a substantially disc shape, and a second flange portion 12C. The second flange portion 12C is an annular shape portion that protrudes from an outer edge of the second main body 12B toward the first internally toothed gear 11.

The second flange portion 12C of the present embodiment includes, as shown in FIG. 7, two ring-shaped portions 12D, 12E that are coaxially arranged. The portion 12E (hereinafter, referred to as a large ring portion 12E), which is arranged outside the portion 12D (hereinafter, referred to as a small ring portion 12D), has the inner diameter that is larger than the small ring portion 12D.

The teeth 12A are provided to an inner circumferential surface of the small ring portion 12D. The second internally toothed gear 12 is configured such that the teeth 12A, the second main body 12B, and the second flange portion 12C (the small ring portion 12D and the large ring portion 12E) are formed as one integral member by plastic working such as forging and press-forming.

In the present embodiment, the driving link 7A is secured to the first internally toothed gear 11 (the first main body 11B) and the support arm 7B is secured to the second internally toothed gear 12 (the second main body 12B). In other words, the link mechanism 7 is coupled to the support arm 7B via the gearing device 10.

<Supporting Structure of Second Internally Toothed Gear>

As shown in FIG. 7, the second internally toothed gear 12 is rotatably supported by the first internally toothed gear 11. Specifically, in the present embodiment, the second flange portion 12C and the first flange portion 11C make sliding-contact with each other, whereby the second internally toothed gear 12 is rotatably supported by the first internally toothed gear 11.

In other words, the sliding-contact can be made between an outer circumferential surface 11D (hereinafter, referred to as a first sliding-contact surface 11D) of the first flange portion 11C and the second flange portion 12C of the second internally toothed gear 12. Also, the sliding-contact can be made between a facing surface 11E (hereinafter, referred to as a second sliding-contact surface 11E) of the first flange portion 11C, which faces the second internally toothed gear 12, and the second flange portion 12C of the second internally toothed gear 12.

Specifically, the sliding-contact is made between the first sliding-contact surface 11D and an inner circumferential surface 12F (hereinafter, referred to as a first sliding-contact target surface 12F) of the large ring portion 12E. The sliding-contact can be made between the second sliding-contact surface 11E and a facing surface 12G (hereinafter, referred to as a second sliding-contact target surface 12G) of the small ring portion 12D, which faces the second sliding-contact surface 11E.

Therefore, the first flange portion 11C (the first internally toothed gear 11) is placed in a state of being fitted in the large ring portion 12E, thereby placing the second internally toothed gear 12 in a state of being rotatably supported by the first internally toothed gear 11.

In other words, the sliding-contact between the first sliding-contact surface 11D and the first sliding-contact target surface 12F restricts displacement of the second internally toothed gear 12 in a diametrical direction with respect to the first internally toothed gear 11 during rotation of the second internally toothed gear 12. The diametrical direction is perpendicular to the rotation center axis Lo.

The sliding-contact between the second sliding-contact surface 11E and the second sliding-contact target surface 12G defines a position of the second internally toothed gear 12 in a direction parallel to the rotation center axis Lo. In relation to this, the gearing device 10 comprises a fixing ring 16. The fixing ring 16 restricts the first internally toothed gear 11 and the second internally toothed gear 12 from being displaced in a manner to be distanced from each other.

<Externally Toothed Gear>

Figure 9:
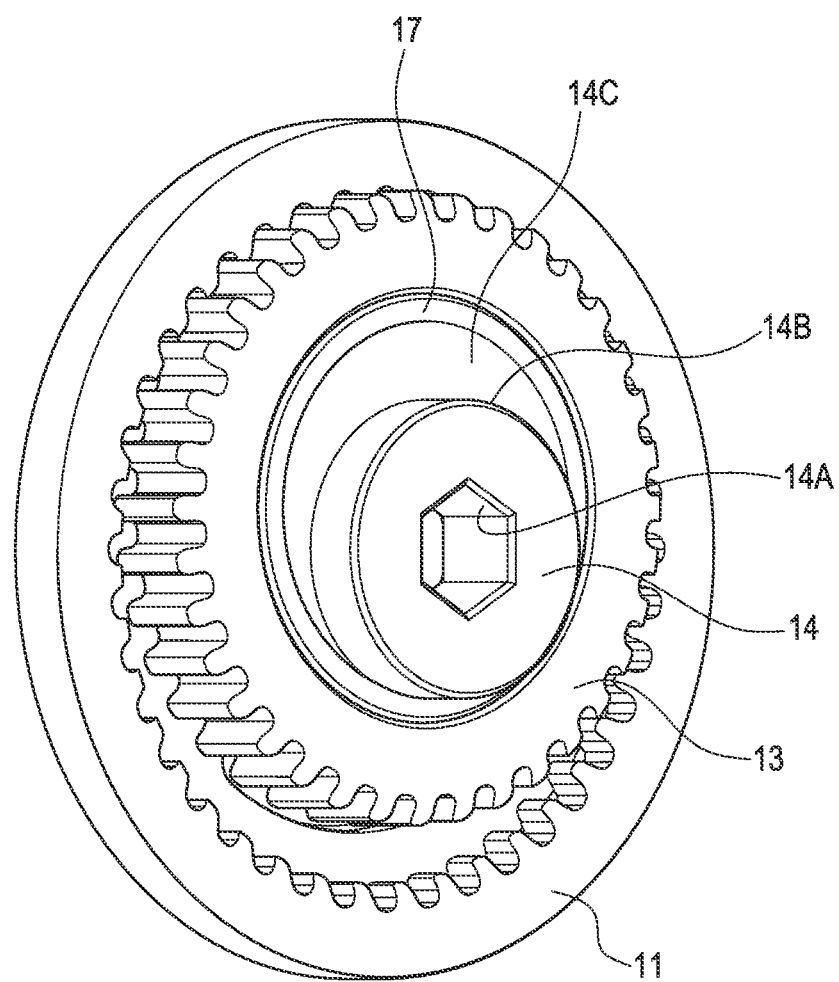
FIG. 9 is a view showing a state in which the first internally toothed gear and an externally toothed gear mesh with each other.
Figure 10:
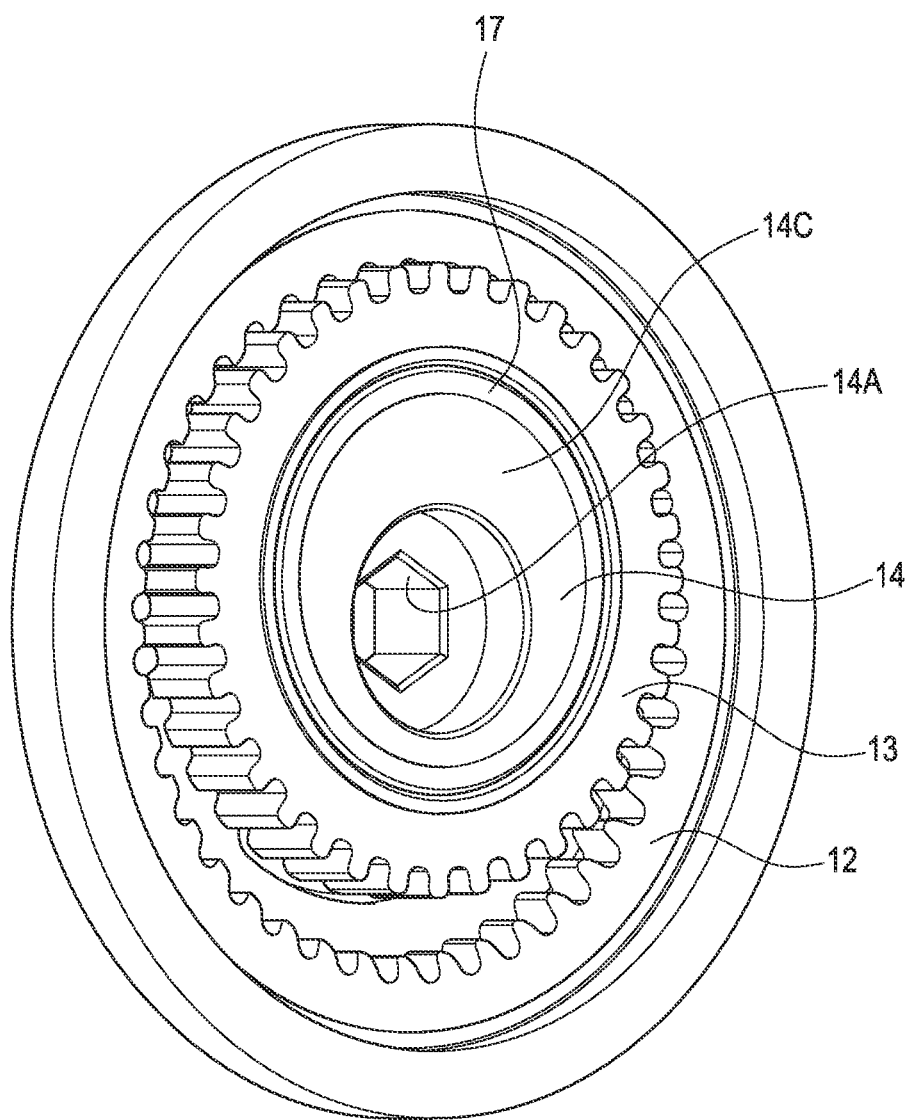
FIG. 10 is a view showing a state in which the second internally toothed gear and the externally toothed gear mesh with each other.

As shown in FIGS. 9 and 10, the externally toothed gear 13 is a pinion that is arranged to an inner side of the first internally toothed gear 11 and an inner side of the second internally toothed gear 12, to thereby mesh with the first internally toothed gear 11 and the second internally toothed gear 12 (see, FIG. 7).

Specifically, as shown in FIG. 7, the externally toothed gear 13 is arranged between the first main body 11B and the second main body 12B and rotates while making sliding-contact with the first main body 11B and the second main body 12B.

The number of teeth Z3 of the externally toothed gear 13 is smaller than the number of teeth Z1 of the first internally toothed gear 11 and the number of teeth Z2 of the second internally toothed gear 12. Therefore, the diameter of a pitch circle of the externally toothed gear 13 is smaller than respective diameters of a pitch circle of the first internally toothed gear 11 and a pitch circle of the second internally toothed gear 12.

Accordingly, in a state where the externally toothed gear 13 mesh with the first internally toothed gear 11 and the second internally toothed gear 12, the rotation center L1 (see, FIG. 3) of the externally toothed gear 13 is always displaced in the diametrical direction with respect to the rotation center axis Lo (the rotation center of the first internally toothed gear 11 and the second internally toothed gear 12).

The number of teeth Z1 of the first internally toothed gear 11 and the number of teeth Z2 of the second internally toothed gear 12 are different. The difference may be, in other words, Z1>Z2 or Z1<Z2.

<Eccentric Member>

As shown in FIG. 9, the eccentric member 14 is a member used to rotate the externally toothed gear 13 such that the rotation center L1 (see, FIG. 3) thereof follows a path around the rotation center axis Lo (in other words, to revolve the rotation center L1 around the rotation center axis Lo) and to rotatably support the externally toothed gear 13 about the rotation center L1 (in other words, to allow the externally toothed gear 13 to rotate).

The eccentric member 14 rotates about the rotation center axis Lo in response to the rotational force of the electric motor 8 being input to the eccentric member 14 via the driving shaft 8A. The eccentric member 14 of the present embodiment is provided with a hole 14A, such as a hexagonal hole, that can lock the driving shaft 8A thereto.

The driving shaft 8A is fitted into the hole 14A to integrally rotate with the eccentric member 14. As the externally toothed gear 13 rotates for one cycle about the rotation center axis Lo, the first internally toothed gear 11 and the second internally toothed gear 12 rotate at respective angles defined in accordance with the difference in the number of teeth.

Specifically, as the externally toothed gear 13 rotates for one cycle, the first internally toothed gear 11 rotates at an angle calculated by the formula: $(Z1-Z3)/Z1 \times 360°$. As the externally toothed gear 13 rotates for one cycle, the second internally toothed gear 12 rotates at an angle calculated by the formula: $(Z2-Z3)/Z2 \times 360°$.

As shown in FIG. 7, the hole 14A of the eccentric member 14 is formed in a cylindrical portion 14B. The cylindrical portion 14B is cylindrical about the rotation center axis Lo. The cylindrical portion 14B is fitted in a hole 12H. The hole 12H is a through hole that is formed in the second main body 12B.

A gap 12J is formed between an inner wall of the hole 12H and the eccentric member 14 (an outer circumferential surface of the cylindrical portion 14B). A portion of the eccentric member 14, which is fitted in the externally toothed gear 13, is provided with an eccentric cam 14C.

The eccentric cam 14C is a cam portion that has a disc shape about the rotation center L1 of the externally toothed gear 13. A bushing 17, which has a cylindrical shape, is fitted and fixed to an outer circumference of the eccentric cam 14C in a pressing manner. The bushing 17 is a part of a sliding bearing portion that makes sliding-contact with an inner circumferential surface of the externally toothed gear 13.

<Bearing Portion>

The bearing portion 15 is a cylindrical portion that is used to rotatably support the eccentric member 14. The bearing portion 15 is attached to the first main body 11B and protrudes from the first main body 11B toward the second main body 12B.

The bearing portion 15 of the present embodiment is manufactured as a component that is separated from the first main body 11B and is thereafter pressed and fitted to the first main body 11B as an integral piece with the first main body 11B. Therefore, a part 15B of the bearing portion 15, which is pressed and fitted to the first main body 11B, has a larger outer diameter relative to a part 15A of the bearing portion 15, which makes the sliding-contact with the inner circumferential surface of the eccentric member 14.

In the present embodiment, the driving shaft 8A passes through the bearing portion 15. For the passage of the driving shaft 8A, the bearing portion 15 is provided with a through hole 15C. The through hole 15C has a larger diameter relative to the maximum external dimension (diameter) of the driving shaft 8A.

<3. Features of Gearing Device of the Present Embodiment>

In the gearing device 10 of the present embodiment, the first internally toothed gear 11 receives most of loads applied to the gearing device 10.

Specifically, since the second internally toothed gear 12 is supported by the first internally toothed gear 11, the first internally toothed gear 11 receives a load applied to the second internally toothed gear 12. Furthermore, the first internally toothed gear 11 inherently receives a meshing pressure generated due to the first internally toothed gear 11 and the externally toothed gear 13 meshing with each other.

Consequently, a point of application of each load is inhibited from being displaced greatly from a direction along the rotation center axis, thereby inhibiting increase in moment (in other words, a tilting moment) that tilts the eccentric member 14. Accordingly, the eccentric member 14 is inhibited from tilting, whereby an occurrence of an operation failure can be inhibited.

The eccentric member 14 is rotatably supported by the first internally toothed gear 11. This enables the first internally toothed gear 11 to also receive a load applied to the eccentric member 14. Therefore, an effect for inhibiting generation of the tilting moment is improved, whereby the occurrence of the operation failure can be inhibited.

The first main body 11B is provided with the bearing portion 15 that protrudes toward the second main body 12B to rotatably support the eccentric member 14. This can inhibit the point of application of each load from being displaced greatly from the direction along rotation center axis.

Specifically, as shown in FIG. 7, the load, which is caused to act on the first internally toothed gear 11 by the second internally toothed gear 12, is defined as a load F1, and the load, which is caused to act on the bearing portion 15 by the eccentric member 14, is defined by a load F2. In this case, respective points of application of the load F1 and load F2 are both situated within a range defined by a thickness of the externally toothed gear 13. Accordingly, the point of application of each load can be inhibited from being displaced greatly from the direction along the center axis.

The inner wall of the hole 12H and the eccentric member 14 form the gap 12J therebetween. The gap 12J improves an effect for inhibiting the load applied to the second internally toothed gear 12 from acting on the eccentric member 14. Accordingly, this can inhibit the point of application of each load from being displaced greatly from the direction along the rotation center axis.

Second Embodiment

In a gearing device 20 of the present embodiment, the eccentric member 14 is downsized relative to that of the gearing device 10 of the above-described first embodiment, and the bushing 17 is eliminated.

The following descriptions are given to a different between the gearing device 20 of the present embodiment and the gearing device 10 of the first embodiment. The same constituent features and the like as in the first embodiment are labelled with the same reference numerals in the first embodiment. Thus, overlapping descriptions are omitted in the present embodiment.

Figure 11:
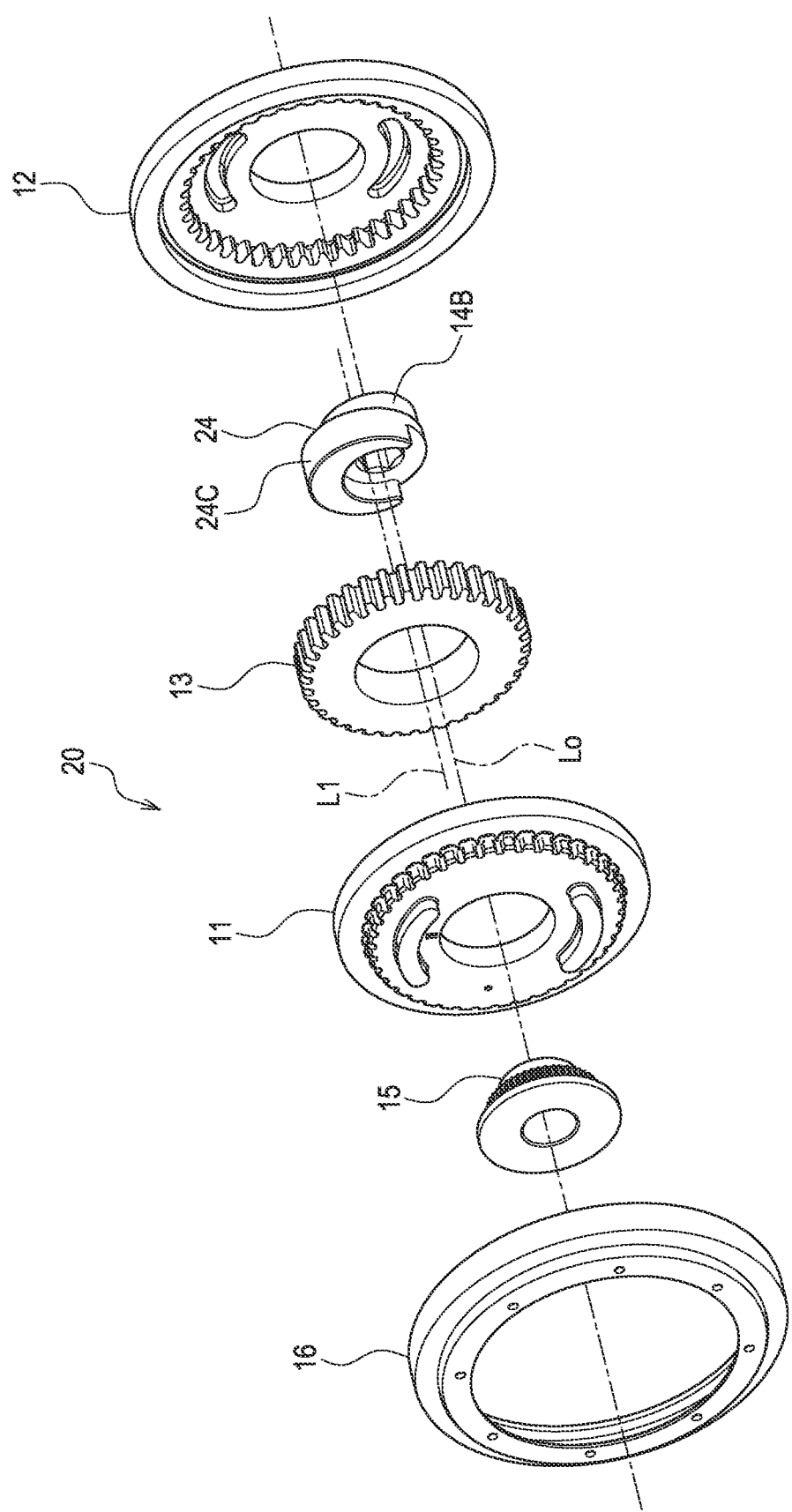
FIG. 11 is an exploded view of a gearing device for a vehicle seat according to a second embodiment.

As shown in FIG. 11, an eccentric cam 24C of an eccentric member 24 of to the present embodiment is configured to have a crescent shape. In other words, the eccentric cam 24C of the present embodiment is not formed into an annular shape, but is formed such that the eccentric cam 24C includes a concave portion on one side of the eccentric member 24 opposite the rotation center L1 with respect to the rotation center axis Lo.

Other Embodiments

For example, the bearing portion 15 may be formed as one integral piece with the first main body 11B.

For example, the driving shaft 8A may not pass through the bearing portion 15.

For example, the support arm 7B may be secured to the first internally toothed gear 11 and the driving link 7A may be secured to the second internally toothed gear 12.

For example, the electric motor 8 may be fixed to the support arm 7B.

The gearing device 10 may be applicable to, for example, a mechanism for electrically adjusting a tilt angle of a headrest.

The vehicle seat 1 can be applied to seats used in other vehicles, such as railroad vehicles, ships and boats, and aircrafts. Furthermore, the vehicle seat 1 can be applied to built-in seats used in theaters, households, and the like.

Furthermore, the present disclosure should not be limited to the above-described embodiments as long as it falls within the spirit of the disclosure described in the above-described embodiments. Accordingly, the present disclosure may be configured in combination of at least two of the above-described embodiments or may be the above-described embodiment(s) configured without either the configuration elements illustrated in the drawings or the configuration elements described with reference numerals.

What is claimed is:

1. A gearing device for a seat comprising:
    a first internally toothed gear including teeth that protrude toward a rotation center axis of the first internally toothed gear;
    a second internally toothed gear having the rotation center axis in common with the first internally toothed gear and including teeth that protrude toward the rotation center axis, the second internally toothed gear being supported by the first internally toothed gear so that the second internally toothed gear rotates relative to the first internally toothed gear;

an externally toothed gear arranged to an inner side of the first internally toothed gear and an inner side of the second internally toothed gear, to thereby mesh with the first internally toothed gear and the second internally toothed gear, the externally toothed gear including teeth that are smaller in number relative to the teeth of the first internally toothed gear and the teeth of the second internally toothed gear;

an eccentric member rotating the externally toothed gear such that a rotation center thereof follows a path around the rotation center axis and rotatably supporting the externally toothed gear about the rotation center, the eccentric member rotating about the rotation center axis in response to a rotational force being externally input thereto; and a driving shaft transmitting the rotational force to the eccentric member, wherein the eccentric member comprises:
an eccentric cam fitted in the externally toothed gear; and
a cylindrical portion inserted into the second internally toothed gear and having a smaller outer diameter than the eccentric cam, wherein the driving shaft is fitted in the cylindrical portion, and wherein the first internally toothed gear includes a first main body provided with a bearing portion that has a cylindrical shape and protrudes toward the second internally toothed gear to directly rotatably support the eccentric member.

2. The gearing device for a seat according to claim 1, wherein the eccentric member is rotatably supported by the first internally toothed gear.

3. The gearing device for a seat according to claim 2, wherein the first internally toothed gear includes:
the first main body having a disc shape; and
a first flange portion having an annular shape and protruding from an outer edge of the first main body toward the second internally toothed gear, wherein the second internally toothed gear includes:
a second main body having a disc shape; and
a second flange portion having an annular shape and protruding from an outer edge of the second main body toward the first internally toothed gear, the second flange portion being placed in sliding contact with the first flange portion, and wherein the second flange portion makes the sliding contact with the first flange portion, whereby the second internally toothed gear is allowed to be rotatably supported by the first internally toothed gear.

4. The gearing device for a seat according to claim 3, wherein the externally toothed gear is arranged between the first main body and the second main body.

5. The gearing device for a seat according to claim 4, wherein the second main body is provided with a hole in which a part of the eccentric member is fitted, and wherein an inner wall of the hole and the eccentric member form a gap therebetween.

6. The gearing device for a seat according to claim 1, wherein the eccentric cam is formed such that the eccentric cam includes a concave portion on one side of the eccentric member opposite a rotation center of the externally toothed gear with respect to the rotation center axis.

* * * * *